United States Patent [19]

Sigg

[11] Patent Number: 4,596,076
[45] Date of Patent: Jun. 24, 1986

[54] DEVICE FOR HANDLING A CYLINDRICAL OR SPHERICAL PIECE

[75] Inventor: Hans Sigg, Neuchatel, Switzerland

[73] Assignee: Meseltron S.A., Corcelles, Switzerland

[21] Appl. No.: 573,916

[22] PCT Filed: May 25, 1983

[86] PCT No.: PCT/CH83/00068
§ 371 Date: Jan. 12, 1984
§ 102(e) Date: Jan. 12, 1984

[87] PCT Pub. No.: WO83/04302
PCT Pub. Date: Dec. 8, 1983

[30] Foreign Application Priority Data

May 25, 1983 [CH] Switzerland ............... 83/00068

[51] Int. Cl.$^4$ .............................................. G01B 7/12
[52] U.S. Cl. .................................... 33/555; 33/178 E; 33/573
[58] Field of Search ............ 33/178 D, 178 E, 178 R, 33/172 R, 549, 550, 551, 552, 553, 554, 555, 573

[56] References Cited

U.S. PATENT DOCUMENTS

| 1,401,119 | 12/1921 | Aldeborgh . |
| 1,617,284 | 2/1927 | Ames ................................ 33/178 R |
| 1,648,497 | 11/1927 | Moore et al. ..................... 33/178 D |
| 2,303,007 | 11/1942 | Thomason . |
| 2,408,672 | 10/1946 | Mennesson ....................... 33/178 D |
| 3,135,056 | 6/1964 | Sleeter ............................ 33/178 D |
| 3,315,367 | 4/1967 | Walsh . |
| 4,132,001 | 1/1979 | Petrik ............................. 33/178 D |

FOREIGN PATENT DOCUMENTS

| 1941051 | 8/1969 | Fed. Rep. of Germany . |
| 433377 | 4/1948 | Italy ................................ 33/172 R |
| 436741 | 11/1967 | Switzerland . |

Primary Examiner—William D. Martin, Jr.
Attorney, Agent, or Firm—Peter L. Berger

[57] ABSTRACT

A device for handling a cylindrical piece (2), equipped with means to measure its diameter comprises two arms (3, 4) provided to grip the piece. In at least one of the arms a dihedron is formed, in which the piece (2) is held, and a length measuring sensor (8) is mounted on the edge of the dihedron, in order to determine the distance from the surface of the piece to the edge, the said distance representing the diameter of the piece.

27 Claims, 3 Drawing Figures

DEVICE FOR HANDLING A CYLINDRICAL OR SPHERICAL PIECE

BACKGROUND OF THE INVENTION

This invention concerns a device for handling a cylindrical or spherical piece, which may comprise, for example, the nipper of a programmable automaton or robot. That device is equipped with simple means to measure the diameter of the piece carried during its handling.

In a great many industrial manufacturing processes, robots are used to handle pieces with a view, for example, to their doing machining or assembly. To verify the presence of the pieces, count them, check their condition and possibly regulate the manufacturing process accordingly, it is advantageous to integrate means of measuring the pieces with the handling device itself.

Of course, numerous robots are equipped with sensors, usually placed at the joints of the elements of the arm designed to grip the piece, which make it possible to determine the position of those elements. However, the limited precision of those sensors and the lack of rigidity of the elements comprising the arm, notably, when the robot is supposed to handle heavy pieces of up to approximately twenty kilograms, make it impossible to take measurements with the necessary precision, which is in the order of a few microns.

Thus, this invention will combine with the handling device a measuring means of simple design to assure rapid, reliable and precise measurement of the pieces being carried.

SUMMARY OF THE INVENTION

For that purpose, the handling device, containing two arms between which the piece is to be gripped, presents in at least one of those arms a dihedron or a trihedron in which the piece is capable of being engaged, depending on whether it is cylindrical or spherical.

Furthermore, a length sensor is mounted on the edge of the dihedron or at the vertex of the trihedron in order to determine the distance from the surface of the piece to the edge or to the vertex, that distance representing the diameter of the piece.

The operating principle of such measuring means, in which the position of a cylindrical piece placed in a V-shaped groove, in relation to the edge of that V-shape, makes it possible to deduce the diameter of the piece, is by itself known. It is described, for example, in the work "Taschenbuch der Langenmesstechnik," Springler VErlag, Berlin, 1954, pp. 466 and 467, and will not be further explained below. This invention presents not only the particular structure for such measuring but also the ability to grip the piece being measured.

BRIEF DESCRIPTION OF THE DRAWING

The invention will be clearly understood by reading the following specification given with reference to the attached drawings, among which.

DETAILED DESCRIPTION OF THE DRAWING

Figure 1:
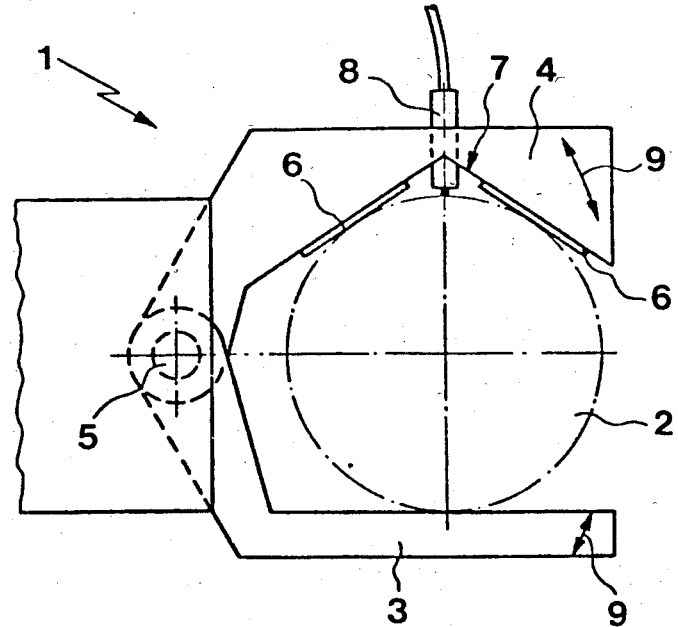
FIG. 1 is a sectional view of a device according to a first embodiment of the invention.

As can best be seen in FIG. 1, the handling device 1 provided to grip a cylindrical piece 2 contains at least two arms 3 and 4 spaced-apart and hinged at 5, so as to be able to grip and hold the piece 2 between the arms. A V-shaped groove or dihedron is formed in arm 4 in which the piece 2 is engaged. The dihedron preferably consists of the outer surface of two or four bars 6 made of a wear-resistant material, such as hard metal, sapphire or even polycrystalline diamond. A length measuring sensor 8 is mounted at the vertex 7 of the dihedron enabling the detection of the position of the surface opposite the piece 2.

Any reasonable type of sensor may be used. It can, for example, be inductive, capacitive, resistive, pneumatic or an optical sensor, and measurement can either necessitate a contact between the end of the sensor and the piece or dispense with it.

Any angle can be formed by the dihedron, but the relation between the diameter of the piece 2 and the indications of the sensor 8 depend on that angle. By choosing for that angle a known value of approximately 112°53'12", the ratio of diameter variations for two given pieces on the corresponding displacement of the measuring sensor is equal to 10, which makes it possible to simply calibrate the measuring means. The arrows 9 of FIG. 1 indicate the movements followed by the two arms of the device to grip or release the piece 2. In order to assure the stability of the latter, it would be sufficient for the arm 3 to be placed opposite the area supporting the piece on the bars 6 of arm 4.

FIG. 1 shows one of the advantages of the invention. In the position represented, the weight of the piece 2, which can be substantial, will not cause any deformation of the upper arm 4 and does not deleteriously affect the precision of measurement, in contrast to what would occur if position sensors of the arms 3 and 4 mounted at the joint 5 were carrying the piece 2.

Figure 2:
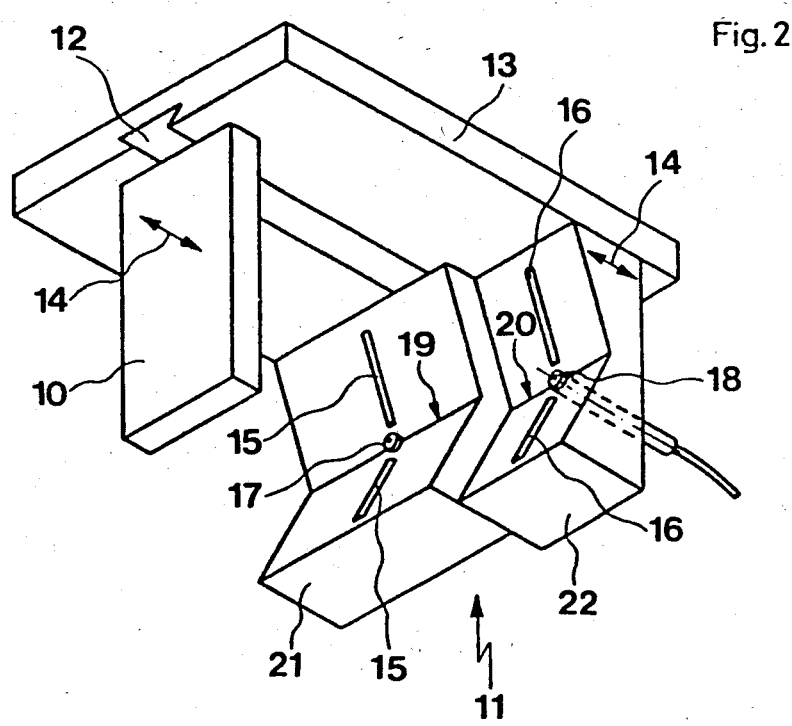
FIGS. 2 and 3 are perspective views of two other embodiments of the invention.

FIG. 2 shows another embodiment of the handling device in which arms 10 and 11 are movable in the groove 12 of a common support 13 in the direction of the arrows 14. Arm 11 is equipped with a first pair of cooperating bars 15 and with a second pair of cooperating bars 16. Each pair of bars forms a particular dihedron, at the vertex of which a different length measuring sensor 17, 18 is placed. That arrangement makes it possible to measure the diameter of a cylindrical piece at two different places and measure its conicity. If it is a question of measuring two different diameters of the pieces, the edges 19 and 20 of the dihedrons formed by the pairs of bars 15 and 16 respectively are shifted perpendicular to the axis of the piece to be measured. In order to facilitate adapting the device to handling of pieces of varied shapes, arm 11 consists of two members 21, 22, each bearing a pair of bars 15 and 16, respectively the relative positions of which can be regulated in a direction perpendicular to the axis of the piece to be gripped.

Figure 3:
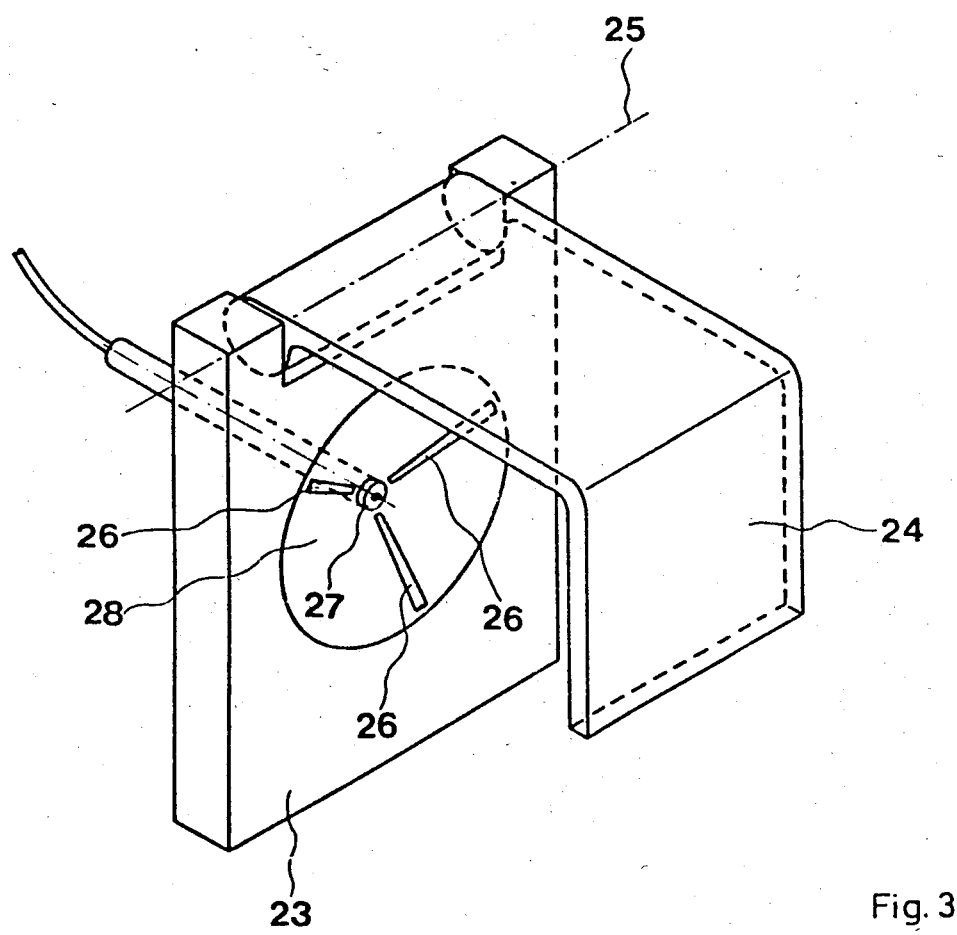

FIG. 3 illustrates a third embodiment of the invention provided for handling spherical pieces. In that case, the device comprises, for example, two arms 23, 24 hinged together at axis 25. Arm 23 contains a depression 28 in which three bars 26 are mounted, so as to form the edges of a trihedron, against which a spherical piece held at the back by arm 24 can be supported. A measuring sensor 27 is located at the vertex of the trihedron or pyramid formed by the directions of bars 26. The indications of the measuring sensor 27 makes it possible to determine the diameter of the piece, taking into account the angle at the vertex of the pyramid.

Although it has been described in relation to only some of its embodiments, the invention lends itself to numerous modifications and variants that will be evident to the expert.

What is claimed is:

1. A device for handling and measuring a piece having a diameter and an external surface, comprising:
   two arm means for gripping and carrying said piece in an industrial manufacturing operation, one of said arm means including a dihedron in which said piece is held while being gripped and carried, said dihedron including an edge and a vertex located at the edge thereof, and
   a length measuring sensor connected at the vertex of said dihedron in said one arm means and extending toward said piece to determine the distance from the external surface of the piece to the vertex of said dihedron for use in determining the diameter of said piece.

2. A device for handling and measuring a piece having a diameter and an external surface, comprising:
   two arm means for gripping and carrying said piece, one of said arm means including a plurality of surfaces used for gripping and carrying said piece in an industrial manufacturing operation in cooperation with said other arm means, said plurality of surfaces meeting at a common vertex; and
   a length measuring sensor connected to said one arm means at said vertex to determine the distance from the external surface of the piece to said vertex when said piece is gripped and carried by said two arm means, for use in determining the diameter of said piece.

3. A device according to claim 2, where said plurality of surfaces form trihedron having said vertex, said length measuring sensor being connected at the vertex of the trihedron.

4. A device according to claim 1, wherein said piece comprises a cylindrical portion the distance from the surface of said cylindrical portion to the vertex of the dihedron representing the diameter of said cylindrical portion.

5. A device according to claim 3, wherein said piece comprises a spherical portion, the distance from the surface of said spherical portion to the vertex of the trihedron representing the diameter of said spherical portion.

6. A device according to claim 1, wherein the dihedron is formed by at least one pair of cooperating bars, said bars being made of a wear-resistant material.

7. A device according to claim 4, wherein the dihedron is formed by at least one pairs of cooperating bars, said bars being made of a wear-resistant material.

8. A device according to claim 6, wherein there are two pair of cooperating bars and two length measuring sensors, and a first length measuring sensor is mounted at the intersection of a first pair of said cooperating bars and a second length measuring sensor is mounted at the intersection of a second pair of said cooperating bars.

9. A device according to claim 7, wherein there are two pair of cooperating bars and two length measuring sensors, and a first length measuring sensor is mounted at the intersection of a first pair of said cooperating bars and a second length measuring sensor is mounted at the intersection of a second air of said cooperating bars.

10. A device according to claim 8, wherein the first and second pairs of bars are shifted in a direction perpendicular to the axis of the piece to be measured to measure a cylindrical piece having cylindrical portions with different diameters.

11. A device according to claim 9, wherein the first and second pairs of bars are shifted in a direction perpendicular to the axis of the piece to be measured to measure a cylindrical piece having cylindrical portions with different diameters.

12. A device according to claim 8, wherein the positions of the two pairs of bars are adjustable in relation to each other in a direction perpendicular to the axis of the piece to be measured to handle pieces of varied shapes.

13. A device according to claim 9, wherein the positions of the two pairs of bars are adjustable in relation to each other in a direction perpendicular to the axis of the piece to be measured to handle piece of varied shaped.

14. A device according to claim 10, wherein the positions of the two pairs of bars are adjustable in relation to each other in a direction perpendicular to the axis of the piece to be measured to handle piece of varied shapes.

15. A device according to claim 11, wherein the positions of the two pairs of bars are adjustable in relation to each other in a direction perpendicular to the axis of the piece to be measured to handle piece of varied shapes.

16. A device according to claim 1, wherein the angle of said dihedron is approximately 112°53'12".

17. A device according to claim 4, wherein the angle of said dihedron is approximately 112°53'12".

18. A device according to claim 6, wherein the angle of said dihedron is approximately 112°53'12".

19. A device according to claim 8, wherein the angle of said dihedron is approximately 112°53'12".

20. A device according to claim 10, wherein the angle of said dihedron is approximately 112°53'12".

21. A device according to claim 12, wherein the angle of said dihedron is approximately 112°53'12".

22. A device according to claim 3, wherein said trihedron is formed by three bars comprising wear-resistant material and extending in the directions of the edges of a pyramid.

23. A device according to claim 5, wherein said trihedron is formed by three bars comprising wear-resistant material and extending in the directions of the edges of a pyramid.

24. A device according to claim 1, wherein the other of said arm means comprises a flat surface to maintain said piece in said dihedron.

25. A device according to claim 4, wherein the other of said arm means comprises a flat surface to maintain said piece in said dihedron.

26. A device according to claim 3, wherein the other of said arm means comprises a flat surface to maintain said piece in said trihedron.

27. A device according to claim 4, wherein said arm means comprising said flat surface bears the weight of said piece.

* * * * *